United States Patent Office 2,838,505
Patented June 10, 1958

2,838,505

N - [(10 - PHENOTHIAZINYL) - LOWER - ALKYL]-1,5-IMINOCYCLOALKANES, SALTS THEREOF AND PREPARATION THEREOF

Bernard L. Zenitz, Delmar, N. Y., assignor to Sterling Drug Inc., New York, N. Y., a corporation of Delaware No Drawing. Application December 12, 1955
Serial No. 552,249

26 Claims. (Cl. 260—243)

This invention relates to new phenothiazinylalkyl amines and methods for the preparation thereof. In particular, the invention concerns N-(10-phenothiazinyl-lower-alkyl)-1,5-iminocycloalkanes and their salts.

Phenothiazines substituted on the nitrogen atom by a dialkylamino-lower-alkyl group are known. According to the present invention, new and useful compounds are obtained when the phenothiazine nucleus is attached through its nitrogen atom by an alkylene bridge to the nitrogen atom of a 1,5-iminocycloalkane radical. The phenothiazine nucleus can be unsubstituted or substituted by one or more substituents inert to the conditions under which the compounds are prepared. The 1,5-iminocycloalkane radical has at least seven ring members, preferably seven or eight, and can be unsubstituted or substituted in the 3-position by hydroxy, acyloxy, halogen or oxo groups.

A preferred aspect of the invention relates to compounds having the formula

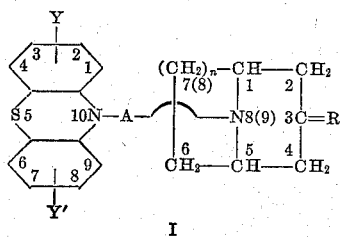

I wherein Y and Y' are hydrogen, halogen, lower-alkyl or lower-alkoxy groups which may be the same or different; A is a lower-alkylene radical; $n$ is an interger from 1 to 2; and R is one of $H_2$, (H)(OH), (H)(OAcyl), (H)(Cl), (H)(Br), and O.

In the above general Formula I, the numbering systems used are in accordance with the standard nomenclature used in the Ring Index and in Chemical Abstracts. In the 1,5-iminocycloalkane moiety, the parenthetical numbers 8 and 9 are used in the case where $n$ is 2.

In the above general Formula I, Y and Y' can be in any of the four available positions in the respective benzene rings. When Y and/or Y' are halogen they can be any of the four halogens, fluorine, chlorine, bromine or iodine, although chlorine and bromine are preferred. When Y and/or Y' are lower-alkyl or lower-alkoxy groups they can have from one to about four carbon atoms and thus include such groups as methyl, ethyl, propyl, isopropyl, butyl, isobutyl, tertiary-butyl, methoxy, ethoxy, propoxy, isopropoxy, butoxy, isobutoxy, tertiary-butoxy, and the like.

In the above general Formula I, the alkylene bridge A has from two to about five carbon atoms, may be straight or branched, and is such that the nitrogen atoms of the phenothiazine and 1,5-iminocycloalkane moieties are separated by at least two carbon atoms. Thus A includes such groups as ethylene, $CH_2CH_2$; propylene, $CH_2CH_2CH_2$; 1-methylethylene, $CH(CH_3)CH_2$; 2-methylethylene, $CH_2CH(CH_3)$; butylene, $CH_2CH_2CH_2CH_2$; 1-methylpropylene, $CH(CH_3)CH_2CH_2$; pentylene, $CH_2CH_2CH_2CH_2CH_2$; and the like. A particularly preferred group of compounds are those in which A is propylene, $CH_2CH_2CH_2$.

In the above general Formula I, $n$ is 1 or 2. When $n$ is 1, the 1,5-iminocycloalkane moiety is a cycloheptane ring, and the whole molecule is a derivative of nortropane or pseudonortropane. When $n$ is 2, the 1,5-iminocycloalkane moiety is a cyclooctane ring, and the whole molecule is a derivative of granatanine or stereoisomer thereof.

In the above general Formula I, R represents groupings which satisfy two of the valences of carbon atom numbered 3 of the cycloalkane ring. In the preferred aspect of the invention, R represents two hydrogen atoms, a hydrogen atom and a hydroxy group, a hydrogen atom and an esterified hydroxy group, a hydrogen atom and a chlorine atom, a hydrogen atom and a bromine atom, or an oxo group. When R contains an esterified hydroxy group, OAcyl, the nature of the acyl group is not critical, provided it is a carboxylic acyl group of relatively low molecular weight, less than about 250. A preferred group of acyl radicals includes lower-alkanoly, such as formyl, acetyl, propionyl, butyryl, isobutyryl, valeryl, capropyl, and the like; carboxy-lower-alkanoyl, such as hemi-succinyl, hemi-glutaryl, hemi-adipyl, and the like; monocarbocyclic aroyl, such as benzoyl, p-toluyl, p-nitrobenzoyl, 3,4-dinitrobenzoyl, p-methoxybenzoyl, 3,4,5-trimethoxybenzoyl, and the like; monocarbocyclic aryl-lower-alkanoyl, such as phenylacetyl, 2-phenylpropionyl, 1-phenyl-propionyl, p-nitrophenylacetyl, and the like; lower-alkenoyl, such as acryloyl, crotonoyl, and the like; monocarbocyclic aryl-lower-alkenoyl, such as cinnamoyl, p-nitrocinnamoyl, phenylcrotonoyl, and the like; and carbamyl, CONR'R", wherein R' and R" are hydrogen or lower-alkyl groups, such as carbamyl, N-methylcarbamyl, N,N-dimethylcarbamyl, and the like.

The compounds of the invention are prepared by reacting in the presence of an acid-acceptor a phenothiazine with a 1,5-iminocycloalkane, in which either the phenothiazine or the 1,5-iminocycloalkane bears attached to nitrogen a halo-lower-alkyl group, and, if desired, reacting the resulting product with a strong acid or ester of a strong acid to produce an acid-addition or quaternary ammonium salt.

The process is carried out by heating a 1,5-iminocycloalkane with a 10-phenothiazinyl-lower-alkyl halide at a temperature between about 50° C. and 150° C. in the presence of an acid-acceptor. The reaction is perferably carried out in an organic solvent, inert under the conditions of the reaction, such as anhydrous ethanol, benzene, xylene and the like. The purpose of the acid-acceptor is to take up the hydrogen halide which is split out during the course of the reaction. The acid-acceptor is a basic substance which preferably forms water-soluble by-products easily separable from the main product of the reaction, including such substances as alkali metal salts of weak acids, e. g., sodium carbonate, potassium carbonate, sodium acetate, sodium alkoxides, sodium amide, and the like.

The reaction of a 10-phenothiazinyl-lower-alkyl halide with a 1,5-iminocycloalkane takes place under relatively mild conditions, a preferred method comprising heating the reactants in boiling ethanol solution in the presence of anhydrous sodium carbonate. The reaction of a phenothiazine with an N-(halo-lower-alkyl)-1,5-iminocycloalkane requires somewhat more vigorous conditions, a preferred method comprising heating the reactants in boiling xylene in the presence of sodium amide.

A variant aspect of the above process, one in which a quaternary ammonium salt is formed directly, comprises reacting an N-lower-alkyl-1,5-iminocycloalkane with a 10-phenothiazinyl-lower-alkyl halide. This reaction is carried out by heating an N-lower-alkyl-1,5-iminocycloalkane with a 10-phenothiazinyl-lower-alkyl halide at a temperature between about 50° C. and about 150° C. until quaternization is essentially complete. The reactants can be heated alone or in an organic solvent, inert under the conditions of the reaction, such as dimethylformamide, acetonitrile, benzene, toluene, or the like.

The various groups represented by R in the above general Formula I are readily interconvertible. The compounds bearing a hydroxy group in the 3-position of the 1,5-iminocycloalkane ring can be esterified by conventional methods, as by heating with the appropriate acid halide or acid anhydride, to give the corresponding acyloxy compounds. The hydroxy compounds can also be oxidized to the corresponding oxo compounds, e. g., with chromic oxide, and, conversely, the oxo compounds reduced to the hydroxy compounds, e. g., with lithium aluminum hydride. The hydroxy compounds can be dehydrated to introduce a double bond between the 1- and 2-positions of the 1,5-iminocycloalkane ring, e. g., by heating with mineral acid, potassium bisulfate, or the like, and the double bond reduced to give compounds unsubstituted in the 3-position ($R=H_2$). Alternatively the hydroxy group in the 3-position can be replaced by chlorine or bromine by treating with thionyl chloride or thionyl bromide, and the resulting 3-chloro or 3-bromo compound can then be dehydrohalogenated by heating with a base, such as alkali metal hydroxides or alkoxides or amino compounds, to give the same unsaturated compound obtained by dehydration of the 3-hydroxy compound. These changes in the group R can be effected either before or after the 1,5-iminocycloalkane and phenothiazine moieties are combined. The foregoing is summarized in the following flow-sheet (X is Cl or Br, and the third valence of the nitrogen atom is left unsatisfied in view of the fact that the reaction can take place either before or after it is connected to the phenothiazine moiety):

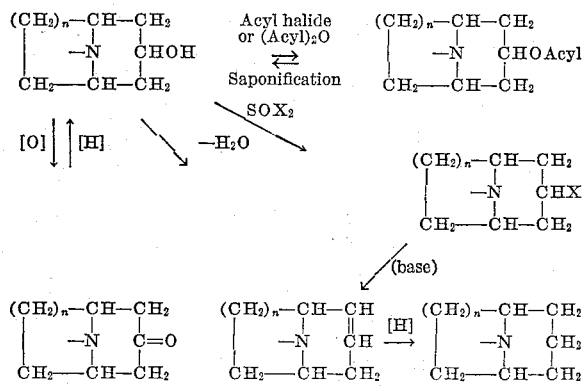

The intermediate 10-phenothiazinyl-lower-alkyl halides are a known class of compounds. They can be prepared by reacting the 10-lithio derivative of phenothiazine or a substituted phenothiazine with the appropriate halo-lower-alkyl p-toluenesulfonate. The substituted phenothiazines are in turn prepared by known methods, e. g., see Charpentier et al., Compt. rend. 235, 59–60 (1952), Evans et al., J. Chem. Soc. 1935, 1263–4 (1935), and Massie, Chem. Rev. 54, 797 (1954).

The non-toxic acid-addition or quaternary ammonium salts of the compounds of Formula I are water-soluble and are the form in which the compounds are conveniently prepared for use physiologically. Non-toxic salts are salts whose anions are innocuous to the animal organism in therapeutic doses of the salts, so that beneficial physiological properties inherent in the free bases are not vitiated by side-effects ascribable to the anions; in other words, the latter do not substantially affect the pharmacological properties inherent in the cations. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of alkyl, alkenyl or aralkyl esters of inorganic acids or organic sulfonic acids to the free base form of the compounds. The alkyl, alkenyl or aralkyl esters so used include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, p-methylsulfonylbenzyl bromide, and the like. As noted above, the quaternary ammonium halides can also be obtained directly by reaction of a 10-phenothiazinyl-alkyl halide with an N-lower-alkyl-1,5-iminocycloalkane.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the alkyl, alkenyl or aralkyl ester in an organic solvent. Heating can be used to facilitate the reaction, although salt formation usually takes place readily at room temperature. The quaternary ammonium salt separates directly or can be obtained by concentration of the solution.

The structures of the compounds of the invention have been established by chemical analysis and by the processes for their preparation, which can only lead to compounds of the structures depicted above.

The following examples will further illustrate the invention, without the latter being limited thereto.

EXAMPLE 1

*8-[3-(10-phenothiazinyl)propyl]-3-hydroxynortropane methochloride*

[I; Y and Y' are H, A is $(CH_2)_3$, n is 1, R is (H)(OH), $CH_3Cl$ salt]. A mixture of 13.8 g. (0.05 mole) of 10-(3-chloropropyl)phenothiazine and 7.1 g. (0.05 mole) of tropine in 25 cc. of dimethylformamide was heated on a steam bath for twenty-four hours. The mixture was cooled in an ice bath, diluted with 50 cc. of anhydrous ether, and again cooled in an ice bath. The solid product which separated was collected by filtration, triturated with acetone and again filtered, giving 13.0 g., M. P. 225–238° C. The product was recrystallized first from 600 cc. of isopropyl alcohol and then twice from a mixture of 50 cc. of absolute ethanol and 75 cc. of anhydrous ether, using activated charcoal for decolorizing purposes. The recrystallized product was dried over phosphorus pentoxide in vacuo (0.05 mm.), giving 8.0 g. of 8-[3-(10-phenothiazinyl)propyl]-3-hydroxynortropane methochloride, M. P. 224.5–245.5° C. (dec.)(corr.).

*Analysis.*—Calcd. for $C_{23}H_{29}ClN_2OS$: N, 6.72; Cl, 8.50. Found: N, 6.81; Cl, 8.44.

8-[3-(10-phenothiazinyl)propyl]-3-hydroxynortropane methochloride, when tested in anesthetized dogs at a dose level of 4 mg. per kg. of body weight for its ability to reverse the blood pressure increase response of epinephrine, showed approximately a 20% depressor effect lasting about ten minutes. The approximate acute intravenous toxicity in mice, $ALD_{50}$ (quantity lethal to 50% of the animals), was 6 mg. per kg. of body weight.

EXAMPLE 2

*8 - [2 - (10-phenothiazinyl)ethyl]-3-hydroxynortropane methochloride*

[I; Y and Y' are H, A is $(CH_2)_2$, n is 1, R is (H)(OH),

CH₃Cl salt]. A mixture of 6.6 g. (0.025 mole) of 10-(2-chloroethyl)- phenothiazine and 3.6 g. (0.025 mole) of tropine was heated without a solvent on a steam bath for one hundred hours. The reaction mixture was dissolved in 100 cc. of ethanol, the solution concentrated to 35 cc. and poured into 400 cc. of anhydrous ether. The supernatant liquid was decanted from the gum which had separated, and the gum was triturated with three 150 cc. portions of dry acetone. The acetone-insoluble fraction was dissolved in 100 cc. of ethanol, using activated charcoal for decolorizing purposes, and the solution concentrated to 40 cc. and diluted while warm with anhydrous ether. After refrigeration, the solid product which had separated was collected by filtration and dried in a desiccator over phosphorus pentoxide. The acetone-soluble fraction was obtained by concentration and recrystallized from an ethanol-ether mixture. The total solids were combined with the product obtained at a similar stage from another run of the same size, recrystallized from an ethanol-ether mixture, and dried over phosphorus pentoxide at 110° C. for twenty hours in vacuo (0.03 mm.), giving 6.7 g. of 8-[2-(10 - phenothiazinyl)ethyl]-3-hydroxynortropane methochloride, M. P. 221–223° C. (corr.).

Analysis.—Calcd. for $C_{22}H_{27}ClN_2OS$: Cl, 8.82; N, 6.87. Found: Cl, 8.81; N, 6.86.

8 - [2 - (10-phenothiazinyl)ethyl]-3-hydroxynortropane methochloride was administered intravenously in aqueous solution to anesthetized dogs at doses of 2 and 4 mg./kg. to determine the extent of antagonization of the blood pressure rise caused variously by histamine, acetylcholine or epinephrine, previously administered in doses sufficient to cause a significant rise in pressure (about 50 mm.). A dose of 4 mg./kg. produced a sharp fall in the blood pressure elevation and required about twenty minutes to recover. The approximate acute intravenous toxicity in mice, ALD₅₀, was 7 mg./kg.

EXAMPLE 3

*8 - [2 - (10 - phenothiazinyl)ethyl]-3-acetoxynortropane methochloride*

[I; Y and Y' are H, A is $(CH_2)_2$, n is 1, R is (H)(OCOCH₃), CH₃Cl salt]. A mixture of 7.8 g. (0.03 mole) of 10-(2-chloroethyl)-phenothiazine and 5.5 g. (0.03 mole) of tropine acetate was heated on a steam bath for seventy-two hours. The reaction mixture was stirred with anhydrous ether and the ether-insoluble product (2.3 g.) was dissolved in 25 cc. of ethanol. The solution was filtered, and 150 cc. of anhydrous ether was added to the filtrate while warm. The solution was seeded with a trace of the original solid product and cooled to 0° C. The solid product which separated was collected by filtration, recrystallized from 25 cc. of ethanol and 200 cc. of ether, and dried over phosphorus pentoxide at 110° C. for five hours in vacuo (0.05 mm.), giving 1.5 g. of 8 - [2 - (10-phenothiazinyl)ethyl]-3-acetoxynortropane methochloride, M. P. 241–243° C. (corr.).

Analysis.—Calcd. for $C_{24}H_{29}ClN_2O_2S$: Cl, 7.97; N, 6.30. Found: Cl, 7.77; N, 6.21.

EXAMPLE 4

*8 - [3 - (10-phenothiazinyl)propyl]-3-acetoxynortropane methochloride*

[I; Y and Y' are H, A is $(CH_2)_3$, n is 1, R is (H)(OCOCH₃), CH₃Cl salt] was prepared from 8.3 g. (0.03 mole) of 10-(3-chloropropyl)phenothiazine and 5.5 g. (0.03 mole) of tropine acetate according to the manipulative procedure described above in Example 3. There was thus obtained 7.3 g. of 8-[3-(10-phenothiazinyl)-propyl]-3-acetoxynortropane methochloride, M. P. 232.5-233.5° C. (corr.).

Analysis.—Calcd. for $C_{25}H_{31}ClN_2O_2S$: Cl, 7.72; N, 6.10. Found: Cl, 7.66; N, 6.07.

By substitution in the foregoing example of the tropine acetate by a molar equivalent amount of pseudotropine, 3-tropanone, tropane, or pseudopelletierine, there can be obtained, respectively, 8-[3-(10-phenothiazinyl)propyl]-3-hydroxypseudonortropane methochloride [I; Y and Y' are H, A is $(CH_2)_3$, n is 1, R is (H)(OH), CH₃Cl salt], 8-[3-(10-phenothiazinyl)propyl]-3-oxonortropane methochloride [I; Y and Y' are H, A is $(CH_2)_3$, n is 1, R is O, CH₃Cl salt], 8-[3-(10-phenothiazinyl)propyl]nortropane methochloride [I; Y and Y' are H, A is $(CH_2)_3$, n is 1, R is H₂, CH₃Cl salt], or 9-[3-(10-phenothiazinyl)propyl]-3-oxogranatanine methochloride [I; Y and Y' are H, A is $(CH_2)_3$, n is 2, R is O, CH₃Cl salt].

EXAMPLE 5

(a) *Nortropine*.—[Modification of method of Polonovski et al., Bull. Soc. Chim. 39, 1147–67 (1926); 41, 1186–1202 (1927), comprising reaction of tropine with hydrogen peroxide to give tropine N-oxide, reaction of the latter with acetic anhydride to give N-O-diacetylnortropine, and finally saponification to nortropine.]

Tropine (141.2 g., 1.0 moles) was dissolved in 450 ml. of acetone and 227 ml. of hydrogen peroxide (30%, about 2.0 moles) was added all at once. The temperature of the solution was kept below 30° C. for eight hours with external cooling. After standing at room temperature for another sixty-four hours, a few hundred mg. of 10% palladium-on-charcoal catalyst was cautiously added to decompose the excess hydrogen peroxide, and the solution was allowed to stand for about fifteen hours to complete the decomposition. External cooling was advisable until the initial vigorous decomposition subsided. Methanol was then added to dissolve crystalline material which had separated, the catalyst was removed by filtration, and the filtrate was concentrated to dryness in vacuo. The residue was dissolved in ethanol and again concentrated to dryness on a steam bath in vacuo. The residue was recrystallized by dissolving it in 250 ml. of absolute alcohol, diluting the solution with 1750 ml. of dry acetone, and cooling in an ice bath. The product was collected by filtration, and dried over phosphorus pentoxide at 55° C. for eight hours (0.05 mm.), giving 104.5 g. of tropine N-oxide, M. P. 228–229° C. (dec.).

Tropine N-oxide (143.5 g.) was added in portions during a one-half hour period to 270 g. of acetic anhydride with stirring. During the addition, the internal temperature was kept at 15–25° C. by external cooling, and the solution was kept at 25–35° C. for about three hours. After standing for about fifteen hours at room temperature, the reaction mixture was heated on a steam bath for two hours, and the excess acetic anhydride was then removed in vacuo. The residual oil was dissolved in ice water and the solution partially saturated with potassium carbonate. The oil which separated was extracted with benzene and with ether, and the benzene and ether solutions were combined and dried over anhydrous calcium sulfate. The solution was concentrated, the residual oil (149 g.), containing N,O-diacetylnortropine, was dissolved in a solution of 150 g. of sodium hydroxide in 1500 ml. of water, and the mixture was heated on a steam bath for twelve hours. The solution was then filtered to remove traces of tar, and the filtrate partially saturated with potassium carbonate. The product which separated from solution was extracted with chloroform, and the chloroform solution was dried over anhydrous calcium sulfate and concentrated in vacuo. The residue (88.6 g.) was recrystallized by dissolving it in 500 ml. of dry acetone, concentrating the solution to about 250 ml. and cooling it in a refrigerator for about fifteen hours. There was thus obtained 65 g. of nortropine, M. P. 154° C. Two more recrystallizations from acetone gave 53.2 g. of nortropine, M. P. 161–163° C.

(b) *8-[2-(10-phenothiazinyl)ethyl]-3-hydroxynortropane hydrochloride*

[I; Y and Y' are H, A is $(CH_2)_2$, n is 1, R is (H)(OH), HCl salt]. A mixture of 7.0 g. (0.055 mole) of nortropine, 15.3 g. (0.050 mole) of 10-(2-bromethyl)phenothiazine and 3.2 g. (0.030 mole) of powdered anhydrous sodium carbonate in 100 ml. of anhydrous ethanol was refluxed with stirring for four hours. An additional 3.2 g. (0.030 mole) of sodium carbonate was then added and the mixture was refluxed for eight hours longer. The inorganic salts were separated by filtration and washed with ethanol, and the filtrate was concentrated in vacuo. The residue was dissolved in 200 ml. of benzene, and the benzene solution was washed first with water and then with 100 ml. of 2 N hydrochloric acid. A precipitate formed during the latter washing, and this was collected by filtration, dissolved in chloroform, washed with water, and dried over anhydrous calcium sulfate. The product, although a hydrochloride salt, was much more soluble in chloroform than in water, consequently very little of the product was removed upon washing with water. The chloroform solution was concentrated, the residue washed with acetone and dried, giving 12.7 g. of 8-[2-(10-phenothiazinyl)ethyl]-3-hydroxynortropane hydrochloride, M. P. 245–247° C. A sample when recrystallized from an ethanol-ether mixture and dried over phosphorus pentoxide in 78° C. for six hours in vacuo (0.05 mm.) had the M. P. 246.5–248.5° C. (corr.).

*Analysis.*—Calcd. for $C_{21}H_{24}N_2OS \cdot HCl$: N, 7.20; Cl, 9.12. Found: N, 7.20; Cl, 8.85.

(c) 8 - [2 - (10 - phenothiazinyl)ethyl] - 3 - hydroxynortropane was prepared from 7.7 g. of the hydrochloride salt obtained above in part (b) by dissolving it in 100 ml. of hot water and making the solution basic with ammonium hydroxide. The solid which separated was collected by filtration, washed with water and dried. The product was dissolved in 150 ml. of hexane, the solution filtered, and the filtrate concentrated to cause the product to recrystallize. There was obtained 5.7 g. of 8-[2-(10-phenothiazinyl)-ethyl]-3-hydroxynortropane, M. P. 126–127.5° C. A sample when recrystallized twice from ethyl acetate and dried over phosphorus pentoxide at 78° C. for seven hours in vacuo (0.05 mm.) had the M. P. 126–128° C. (corr.).

*Analysis.*—Calcd. for $C_{21}H_{24}N_2OS$: N, 7.95; S, 9.09. Found: N, 8.03; S, 9.23.

8-[2-(10-phenothiazinyl)ethyl] - 3 - hydroxynortropane reacts with hydrochloric acid, sulfuric acid, acetic acid and the like, to give the hydrochloride, sulfate (or bisulfate), acetate, and the like salts.

EXAMPLE 6

*8-[2-(10-phenothiazinyl)ethyl]-3-acetoxynortropane*

[I; Y and Y' are H, A is $(CH_2)_2$, n is 1, R is (H)(OCOCH_3)]. A mixture of 7.0 g. (0.05 mole) of 8-[2-(10-phenothiazinyl)ethyl] - 3 - hydroxynortropane, 35 ml. of acetic anhydride and one drop of concentrated sulfuric acid was heated on a steam bath for six hours and then allowed to stand at room temperature for about two days. The excess acetic anhydride was removed in vacuo, the residue was dissolved in 100 ml. of water, using activated charcoal for decolorizing purposes, and the solution was cooled in an ice bath and made basic with 10% sodium hydroxide solution. The product was extracted with chloroform, and the chloroform solution washed with water, dried over anhydrous calcium sulfate and concentrated in vacuo. The residue was crystallized from 100 ml. of hexane, giving 5.1 g. of 8-[2-(10-phenothiazinyl)ethyl] - 3 - acetoxynortropane, M. P. 114–115° C. The analytic sample was recrystallized twice from hexane, using activated charcoal for decolorizing purposes, and dried over phosphorus pentoxide for two hours in vacuo (0.05 mm.), and had the M. P. 114–115° C. (corr.).

*Analysis.*—Calcd. for $C_{23}H_{26}N_2O_2S$: N, 7.10; S, 8.13. Found: N, 7.03; S, 8.01.

8 - [2-(10-phenothiazinyl)ethyl]-3-acetoxynortropane reacts with hydrochloric acid, sulfuric acid, acetic acid and the like, to give the hydrochloride, sulfate (or bisulfate), acetate, and the like salts.

EXAMPLE 7

*8-[3-(10-phenothiazinyl)propyl]-3-hydroxynortropane*

[I; Y and Y' are H, A is $(CH_2)_3$, n is 1, R is (H)(OH)]. A mixture of 13.8 g. (0.05 mole) of 3-(10-phenothiazinyl) propyl chloride, 7.6 g. (0.05 mole) of nortropine, 5.3 g. (0.05 mole) of powdered anhydrous sodium carbonate in 100 ml. of absolute ethanol was refluxed with stirring for five hours. An additional 2.6 g. of sodium carbonate was then added, and the mixture refluxed for twenty-one hours longer. An additional 2.6 g. of sodium carbonate was added, and the mixture was refluxed for three hours longer. The reaction mixture was filtered and concentrated, and the residue was dissolved in 200 ml. of benzene. The benzene solution was diluted with 100 ml. of hexane, washed with water until neutral, and extracted with 400 ml. of water containing 15 ml. of concentrated hydrochloric acid. The aqueous acidic extracts were washed with benzene and made basic with 50% sodium hydroxide solution. The gum which separated was extracted with chloroform, and the chloroform extracts washed with water, dried over anhydrous calcium sulfate and concentrated in vacuo. The residue was extracted with five 200 ml. portions of boiling hexane, and the combined hexane solutions filtered, concentrated to 500 ml. volume, seeded, and cooled in an ice bath. The resulting product was collected by filtration (14.9 g.), and recrystallized from 500 ml. of hexane and dried over phosphorus pentoxide for four hours at 55° C. in vacuo (0.05 mm.), giving 6.9 g. of 8-[3-(10-phenothiazinyl) - propyl]-3-hydroxynortropane, M. P. 87.5–89° C. (corr.).

*Analysis.*—Calcd. for $C_{22}H_{26}N_2OS$: N, 7.64; S, 8.75. Found: N, 7.51; S, 8.88.

A sample of 8-[3-(10-phenothiazinyl)propyl]-3-hydroxynortropane was dissolved in ether and an excess of ethereal hydrogen chloride was added. A white, amorphous solid formed which was collected by filtration and dissolved in ethanol. Ether was added to the ethanol solution and the latter was allowed to stand in a refrigerator until crystallization took place. The product was recrystallized from an ethanol-ethyl acetate mixture, giving 8-[3-(10-phenothiazinyl)propyl]-3-hydroxynortropane hydrochloride, M. P. 177–179° C.

8-[3-(10-phenothiazinyl)propyl]-3-hydroxynortropane, dissolved in an equivalent amount of dilute hydrochloric acid and administered intravenously at dose levels of 0.1–0.2 mg./kg., brought about complete reversal of the pressor response (about 50 mm.) caused by epinephrine in anesthetized dogs. The approximate acute oral toxicity of the compound in mice, $ALD_{50}$, was 875 mg./kg. This compound, administered subcutaneously at a dose level of 8.0 mg./kg. doubled the sleeping time of mice treated with hexobarbital sodium.

EXAMPLE 8

*8-[3-(10-phenothiazinyl)propyl]-3-acetoxynortropane*

[I; Y and Y' are H, A is $(CH_3)_3$, n is 1, R is (H)(OCOCH_3)]. A mixture of 8.0 g. 8-[3-(10-phenothiazinyl)propyl]-3-hydroxynortropane and 50 ml. of acetic anhydride was heated on a steam bath for seven hours. After standing at room temperature for about fifteen hours, the excess acetic anhydride was removed in vacuo, and the residue was washed with 100 ml. of cold acetone, giving 5.6 g. of crystalline product, M. P. 142–143° C. The acetone washings were concentrated in vacuo, and the residue washed with cold acetone, giving an additional 1.6 g., M. P. 142–143° C. The combined solids were recrystallized twice from hexane, using activated charcoal for decolorizing purposes, and dried over phosphorus pentoxide for four hours at 55° C. in vacuo (0.05 mm.), giving 5.5 g. of 8-[3-(10-phenothiazinyl)propyl]-3-acetoxynortropane, M. P. 141–143.5° C. (corr.).

*Analysis.*—Calcd. for $C_{24}H_{28}N_2O_2S$: N, 6.86; S, 7.85. Found: N, 6.74; S, 7.83.

8-[3-(10-phenothiazinyl)propyl]-3 - acetoxynortropane hydrochloride, M. P. 218–220° C., was prepared from the free base and ethereal hydrogen chloride, according to the procedure described above in Example 7.

By substitution in the foregoing example of the acetic anhydride by a molar equivalent amount of propionic anhydride, butyric anhydride or succinic anhydride, there can be obtained, respectively, 8-[3-(10-phenothiazinyl)-propyl]-3-propionoxynortropane [I; Y and Y' are H, A is $(CH_2)_3$, $n$ is 1, R is (H)(OCOCH$_2$CH$_3$)], 8-[3-(10-phenothiazinyl)propyl]-3-butyryloxynortropane [I; Y and Y' are H, A is $(CH_2)_3$, $n$ is 1, R is $(H)(OCOCH_2CH_2CH_3)$]

or 8-[3-(10-phenothiazinyl)propyl]-3-(β-carboxypropionoxy)nortropane [I; Y and Y' are H, A is $(CH_2)_3$, $n$ is 1 R is (H) (OCOCH$_2$CH$_2$COOH)].

8-[3-(10-phenothiazinyl)propyl]-3- acetoxynortropane, dissolved in an equivalent amount of dilute hydrochloric acid and administered intravenously at a dose level of 0.2 mg./kg., completely reversed the pressor response (about 50 mm.) caused by epinephrine in anesthetized dogs. The acute intravenous toxicity of the compound in mice, $LD_{50}$, was 32.5±2.2 mg./kg., and the oral $LD_{50}$ value was 1000±161mg./kg.

EXAMPLE 9

*8-[3-(10-phenothiazinyl)propyl]-3-cinnamoyloxynortropane*

[I; Y and Y' are H, A is $(CH_2)_3$, $n$ is 1, R is (H)(OCOCH=CHC$_6$H$_5$)]. A mixture of 7.3 g. (0.020 mole) of 8-[3-(10-phenothiazinyl)propyl]-3-hydroxynortropane and 4.2 g. (0.025 mole) of cinnamoyl chloride in 25 ml. of chloroform was kept at 25–30° C. for ten minutes by external cooling, then kept at room temperature for about two days and finally refluxed for three and one-half hours. The reaction mixture was diluted with 100 ml. of chloroform, and the chloroform solution was washed with sodium hydroxide and water, and dried over anhydrous calcium sulfate. The chloroform solution was concentrated in vacuo, and the residue recrystallized from 40 ml. of acetone, giving 7.8 g. of 8-[3-(10-phenothiazinyl)propyl]-3-cinnamoyloxynortropane, M. P. 138–140° C. A further recrystallization from acetone gave a sample with the M. P. 139–141.5° C. (corr.).

*Analysis.*—Calcd. for $C_{31}H_{32}N_2O_2S$: N, 5.64; S, 6.45; C, 74.96; H, 6.49. Found: N, 5.61; S, 6.23; C, 75.37; H, 6.70.

8-[3-(10-phenothiazinyl)propyl]- 3 - cinnamoyloxynortropane reacts with hydrochloric acid, sulfuric acid, acetic acid and the like, to give the hydrochloride, sulfate (or bisulfate), acetate, and the like salts.

8-[3-(10-phenothiazinyl)propyl]- 3 - cinnamoyloxynortropane, dissolved in dilute acetic acid and administered intravenously at dose levels of 0.2–0.5 mg./kg., brought about complete reversal of the pressor response (about 50 mm.) caused by epinephrine in anesthetized dogs.

By substitution in the foregoing example of the cinnamoyl chloride by a molar equivalent amount of acryloyl chloride or crotonoyl chloride, there can be obtained, respectively, 8-[3-(10-phenothiazinyl)propyl]-3-acryloyloxynortropane [I; Y and Y' are H, A is $(CH_2)_3$, $n$ is 1, R is (H) (OCOCH=CH$_2$)], or 8-[3-(10-phenothiazinyl)-propyl]-3-crotonoyloxynortropane [I; Y and Y' are H, A is $(CH_2)_3$, $n$ is 1, R is (H)(OCOCH$_2$=CHCH$_3$)].

EXAMPLE 10

*8-[3-(10-phenothiazinyl)propyl]-3-(3,4,5-trimethoxybenzoyloxy)-nortropane*

[I; Y and Y' are H, A is $(CH_3)_3$, $n$ is 1, R is (H)(OCOC$_6$H$_2$(OCH$_3$)$_3$-3,4,5)] was prepared from 7.3 g. (0.020 mole) of 8-[3-(10-phenothiazinyl)propyl]-3-hydroxynortropane and 5.7 g. (0.025 mole) of 3,4,5-trimethoxybenzoyl chloride in 20 ml. of chloroform according to the manipulative procedure described above in Example 9. A small portion of the gummy product was caused to crystallize by trituration under hexane. This crystalline material was added to a solution of the main product in acetone. There was thus obtained 4.1 g. of 8-[3-(10-phenothiazinyl)propyl]-3-(3,4,5- trimethoxybenzoyloxy)nortropane, M. P. 143–147° C. After several recrystallizations from acetone a sample was obtained with the M. P. 151.5–153.5° C. (corr.).

*Analysis.*—Calcd. for $C_{32}H_{36}N_2O_5S$: N, 5.00; C, 68.54; H, 6.47. Found: N, 4.92; C, 68.31; H, 6.70.

8-[3(10-phenothiazinyl)propyl]-3 - (3,4,5 - trimethoxybenzoyloxy)nortropane reacts with hydrochloric acid, sulfuric acid, acetic acid and the like, to give the hydrochloride, sulfate (or bisulfate), acetate, and the like salts.

8-[3-(10-phenothiazinyl)propyl]-3- (3,4,5 - trimethoxybenzoyloxy)nortropane, dissolved in dilute acetic acid and administered intravenously at dose levels of 0.1–0.2 mg./kg., brought about complete reversal of the pressor response (about 50 mm.) caused by epinephrine in anesthetized dogs.

EXAMPLE 11

*8-[3-(10-phenothiazinyl)propyl]-3-benzoyloxynortropane*

[I; Y and Y' are H, A is $(CH_2)_3$, $n$ is 1, R is (H)(OCOC$_6$H$_5$)]. A mixture of 3.7 g. (0.01 mole) of 8 - [3 - (10 - phenothiazinyl)propyl] - 3 - hydroxynortropane and 1.8 g. (0.013 mole) of benzoyl chloride in 20 ml. of pyridine was kept at 0° for fifteen minutes, and then at room temperature for sixty-five hours. The reaction mixture was poured into ice water, the gum which separated was extracted with benzene, and the benzene extracts washed with 5% sodium carbonate and water, and dried over anhydrous calcium sulfate. The benzene solution was concentrated in vacuo, and the residue was recrystallized from hexane, giving 3.6 g. of 8-[3-(10-phenothiazinyl)propyl] - 3 - benzoyloxynortropane, M. P. 120–122° C. A sample when recrystallized from hexane and dried over phosphorus pentoxide at 55° C. for four hours in vacuo (0.05 mm.) had the M. P. 121–122° C. (corr.).

*Analysis.*—Calcd. for $C_{29}H_{30}N_2O_2S$: N, 5.95; S, 6.8; C, 74.01; H, 6.42. Found: N, 5.90; S, 6.61; C, 74.43; H, 6.54.

8 - [3 - (10 - phenothiazinyl)propyl] - 3 - benzoyloxynortropane reacts was hydrochloric acid, sulfuric acid, acetic acid and the like, to give the hydrochloride, sulfate (or bisulfate), acetate, and the like salts.

8 - [3 - (10 - phenothiazinyl)propyl] - 3 - benzoyloxynortropane, dissolved in dilute acetic acid and administered intravenously at dose levels of 0.1–0.2 mg./kg., brought about complete reversal of the pressor response (about 50 mm.) caused by epinephrine in anesthetized dogs.

By substitution in the foregoing example of the benzoyl chloride by a molar equivalent amount of p-nitrobenzoyl chloride, phenylacetyl chloride, or N,N - dimethylcarbamoyl chloride, there can be obtained, respectively, 8 - [3 - (10 - phenothiazinyl)propyl] - 3 - (p - nitrobenzoyloxy)nortropane [I; Y and Y' are H, A is $(CH_2)_3$, $n$ is 1, R is (H)(OCOC$_6$H$_4$NO$_2$-p)], 8-[3-(10-phenothiazinyl)propyl]-3-phenylacetoxynortropane [I; Y and Y' are H, A is $(CH_2)_3$, $n$ is 1, R is (H)(OCOCH$_2$C$_6$H$_5$)], or 8 - [3 - (10 - phenothiazinyl)propyl] - 3 - (N,N - dimethylcarbamyloxy)nortropane [I; Y and Y' are H, A is $(CH_2)_3$, $n$ is 1, R is (H)(OCON(CH$_3$)$_2$)].

EXAMPLE 12

*8-[4-(10-phenothiazinyl)butyl]-3-hydroxynortropane*

[I; Y and Y' are H, A is $(CH_2)_4$, $n$ is 1, R is (H)(OH)] was prepared from 12.6 g. of 4-(10-phenothiazinyl)butyl chloride, 6.4 g. of nortropine, 9.2 g. of sodium carbonate and 100 ml. of ethanol according to the manipulative procedure described above in Example 7. There was thus obtained 10.9 g. of 8-[4-(10-phenothiazinyl)butyl]-3-hydroxynortropane, M. P. 133–137° C. (corr.), when recrystallized from ethyl methyl ketone.

*Analysis.*—Calcd. for $C_{23}H_{28}N_2OS$: N, 7.36; S, 8.43. Found: N, 7.23; S, 8.05.

8 - [4 - (10 - phenothiazinyl)butyl] - 3 - hydroxynortropane reacts with hydrochloric acid, sulfuric acid, acetic acid and the like, to give the hydrochloride, sulfate (or bisulfate), acetate, and the like salts.

EXAMPLE 13

*8-[4-(10-phenothiazinyl)butyl]-3-acetoxynortropane*

[I; Y and Y' are H, A is $(CH_3)_4$, $n$ is 1, R is $(H)(OCOCH_3)$] was prepared from 5.9 g. of 8-[4-(10-phenothiazinyl)butyl]-3-hydroxynortropane and 35 ml. of acetic anhydride according to the manipulative procedure described above in Example 6. The product was recrystallized first from ethyl methyl ketone and then from hexane, giving 4.4 g. of 8-[4-(10-phenothiazinyl)butyl]-3-acetoxynortropane, M. P. 115.5-118° C. (corr.).

*Analysis.*—Calcd. for $C_{25}H_{30}N_2O_2S$: N, 6.63; S, 7.59. Found: N, 6.55; S, 7.55.

8 - [4 - (10 - phenothiazinyl)butyl] - 3 - acetoxynortropane reacts with hydrochloric acid, sulfuric acid, acetic acid and the like, to give the hydrochloride, sulfate (or bisulfate), acetate, and the like salts.

EXAMPLE 14

*(a) 5-chloropentyl p-toluenesulfonate*

A mixture of 190.6 g. (1.0 mole) of p-toluenesulfonyl chloride, 111.8 g. (1.3 moles) of tetrahydropyran and 12.4 g. (0.09 mole) of freshly fused zinc chloride was gradually heated, and a vigorous reaction began at about 90° C., whereupon the reaction temperature rose to 156° C. without the aid of external heating. When the reaction has slackened, the mixture was heated on a steam bath for twenty-four hours with stirring. The reaction mixture was then added to cracked ice, extracted with ether, and the ether extracts were washed successively with water, sodium carbonate solution, and again with water, and dried over anhydrous potassium carbonate and anhydrous calcium sulfate. The ether solution was concentrated, and the residue distilled after adding 10 g. of pulverized sodium hydroxide. The fraction boiling at 155–166° C. (0.25–0.32 mm.) was collected; 149.6 g., $n_D^{25}=1.5157$. This material was redistilled, giving 122.9 g. of 5-chloropentyl p-toluenesulfonate, B. P. 148–153° C. (0.14–0.23 mm.), $n_D^{25}=1.5157$.

*Ananlysis.*—Calcd. for $C_{12}H_{17}ClO_3S$: C, 52.07; H, 6.19; S, 11.58. Found: C, 52.13; H, 6.72; S, 11.38.

*(b) 10-(5-chloropentyl)phenothiazine*

Lithium wire (7.64 g., 1.10 moles) was cut into small pieces and added to 300 ml. of anhydrous ether in a nitrogen atmosphere. The mixture was cooled to 0° C. and a few ml. of n-butyl bromide in 70 ml. of ether was added. The mixture was further cooled to —10° C., and sufficient n-butyl bromide to bring the total to 75.5 g. (0.55 mole) was added during one hour. The mixture was stirred for one hour at 0° C., then cooled to —10° C., and 99.5 g. (0.50 mole) of phenothiazine was added during ten minutes. The reaction mixture was stirred for one hour, cooled to —15° C., and 138.2 g. of 5-chloropentyl p-toluenesulfonate in 125 ml. of ether was added during one hour. The reaction mixture was stirred at —10° C. for one-half hour, at 0° C. for one-half hour and at room temperature for one hour. The ether solution was extracted with water, dried over anhydrous calcium sulfate and concentrated. The residue (150 g.) was dissolved in 1 liter of hexane and chromatographed on a 4.5 x 70 cm. aluminum oxide column. The column was eluted with 10 liters of hexane and the resulting 120 g. of product was rechromatographed on a 3.5 x 60 aluminum oxide column. The product thus obtained was distilled, collecting the fraction boiling at 157.5–160° C. (0.090 mm.), giving 86.0 g. of 10-(5-chloropentyl)phenothiazine, $n_D^{25}=1.6391$.

*Analysis.*—Calcd. for $C_{17}H_{18}ClNS$: Cl, 11.67; S, 10.55. Found: Cl, 11.54; S, 10.28.

By substitution in the preceding example of the 5-chloropentyl p-toluenesulfonate by a molar equivalent amount of 3-chloropropyl p-toluenesulfonate, and the phenothiazine by a molar equivalent amount of nortropine, 3 - granatanol, 2 - bromophenothiazine, 1 - methylphenothiazine, 3 - methylphenothiazine, 3,7 - dimethylphenothiazine, 4-chlorophenothiazine, 2,8-dichlorophenothiazine, 3-methoxyphenothiazine, 3,7-dimethoxyphenothiazine, or 3-chloro-7-methoxyphenothiazine (prepared by condensation of 4-chloro-4'-methoxydiphenylamine and sulfur), there can be obtained, respecitvely, 8-(3-chloropropyl)nortropine, 9-(3-chloropropyl)-3-granatanol, 2-bromo - 10 - (3-chloropropyl)phenothiazine, 1-methyl-10-(3 - chloropropyl)phenothiazine, 3 - methyl-10-(3-chloropropyl)phenothiazine, 3,7-dimethyl-10-(3-chloropropyl)phenothiazine, 4 - chloro-10-(3-chloropropyl)phenothiazine, 2,8-dichloro-10-(3-chloropropyl)phenothiazine, 3-methoxy-10-(3-chloropropyl)phenothiazine, 3,7-dimethoxy-10-(3-chloropropyl)-phenothiazine, or 3-chloro-7-methoxy-10-(3-chloropropyl)phenothiazine.

*(c) 8-[5-(10-phenothiazinyl)pentyl]-3-hydroxynortropane hydrochloride*

[I; Y and Y' are H, A is $(CH_2)_5$, $n$ is 1, R is $(H)(OH)$, HCl salt] was prepared from 21.3 g. (0.070 mole) of 10-(5-chloropentyl)phenothiazine, 9.8 g. (0.077 mole) of nortropine, and 14.8 g. of anhydrous sodium carbonate in 125 ml. of ethanol according to the manipulative procedure described above in Example 7. The crude basic product dissolved in 200 ml. of hexane and 400 ml. of anhydrous ether was converted to the hydrochloride salt by treatment with an excess of ethereal hydrogen chloride. The product which separated was collected by filtration, recrystallized twice from an ethanol-ether mixture, and dried over phosphorus pentoxide in the usual manner, giving 16.2 g. of 8-[5-(10-phenothiazinyl)pentyl]-3-hydroxynortropane hydrochloride, M. P. 192–194° C. (corr.).

*Analysis.*—Calcd. for $C_{24}H_{30}N_2OS \cdot HCl$: S, 7.44; Cl, 8.22. Found: S, 7.12; Cl, 8.12.

EXAMPLE 15

*8-{3-[10-(2-chlorophenothiazinyl)]propyl}-3-hydroxynortropane*

[I; Y is 2-Cl, Y' is H, A is $(CH_2)_3$, $n$ is 1, R is $(H)(OH)$]. A solution of 31 g. (0.10 mole) of 3-[10-(2-chlorophenothiazinyl)]propyl chloride [B. P. 161–162° C. (0.06 mm.)] and 14 g. (0.11 mole) of nortropine in 200 ml. of absolute alcohol was refluxed with stirring with 10.6 g. (0.10 mole) of anhydrous powdered sodium carbonate for eighteen hours. An additional 5.3 g. (0.05 mole) of sodium carbonate was added, and the solution was refluxed with stirring for another nine hours. Finally an additional 5.3 g. of sodium carbonate was added and the solution was refluxed with stirring for an additional twenty-one hours. The reaction mixture was filtered to remove inorganic salts which were washed with alcohol. The combined filtrate and washings were heated on a steam bath under reduced pressure to remove the alcohol. The residue was dissolved in 250 ml. of benzene, and the benzene solution was washed with water until the washings were neutral. The benzene solution was dried over anhydrous calcium sulfate and concentrated on a steam bath in vacuo. The residue (41.2 g.) was recrystallized twice from about 100 ml. of acetone, giving 31 g. of 8-{3-[10-(2-chlorophenothiazinyl)]propyl}-3-hydroxynortropane, M. P. 119.5–122° C. (corr.).

*Analysis.*—Calcd. for $C_{22}H_{25}ClN_2OS$: N, 6.99; S, 7.99. Found: N, 6.79; S, 7.71.

8-{3-[10-(2-chlorophenothiazinyl)]propyl} - 3 - hydroxynortropane, dissolved in an equivalent amount of dilute hydrochloric acid, was found to increase the thiopental sodium-induced sleeping time in mice by about 15 times when administered subcutaneously at a dose level of 4.0 mg./kg. The compound also increased the ether-induced sleeping time in mice by about 12 times and the hexobarbital sodium-induced sleeping time in mice by about 2 times at the same dose level. At a dose level of 4.0 mg./kg. the compound reduced the rectal temperature in mice by 10.4° F. two hours after administration. An 0.5 mg./kg. subcutaneous dose of the compound reduced by 90% the frequency of vomiting due to apomorphine-induced emesis in dogs. This compound was found to be at least twice as effective as chloropromazine in protecting mice against fatal doses of epinephrine, and in dogs at doses of 0.1 to 0.2 mg./kg., administered intravenously, it produced reversal of the pressor response (about 50 mm.) caused by injected epinephrine. The acute intravenous toxicity in mice of 8 - {3 - [10 - (2 - chlorophenothiazinyl)]propyl} - 3 - hydroxynortropane was $41 \pm 2$ mg./kg. ($LD_{50}$), and the oral $LD_{50}$ was $260 \pm 42$ mg./kg. after seven days.

By substitution in the preceding example of the 3-[10-(2-chlorophenothiazinyl)]propyl chloride by a molar equivalent amount of 3-[10-(2-bromophenothiazinyl)]propyl chloride, 3-[10-(1-methylphenothiazinyl)]propyl chloride, 3-[10-(3-methylphenothiazinyl)]propyl chloride, 3-[10-(3,7-dimethylphenothiazinyl)]propyl chloride, 3-[10-(4-chlorophenothiazinyl)]propyl chloride, 3-[10-(2,8-dichlorophenothiazinyl)]propyl chloride, 3-[10-(3-methoxyphenothiazinyl)]propyl chloride, 3-[10-(3,7-dimethoxyphenothiazinyl)]propyl chloride, 3-[10-(3-chloro-7-methoxyphenothiazinyl)]propyl chloride, or 1-methyl-2-(10-phenothiazinyl)-ethyl bromide, there can be obtained, respectively, 8-{3 - [10 - (2-bromophenothiazinyl)]propyl}-3-hydroxynortropane [I; Y is 2-Br, Y' is H, A is $(CH_2)_3$ n is 1, R is (H)(OH)], 8-{3-[10-(1-methylphenothiazinyl)]propyl}-3-hydroxynortropane [I; Y is 1-$CH_3$, Y' is H, A is $(CH_2)_3$, n is 1, R is (H)(OH)], 8-{3-[10 - (3 - methylphenothiazinyl)]propyl}-3-hydroxynortropane [I; Y is 3-$CH_3$, Y' is H, A is $(CH_2)_3$, n is 1, R is (H)(OH)], 8-{3-[10-(3,7-dimethylphenothiazinyl)]propyl}-3-hydroxynortropane [I; Y is 3-$CH_3$, Y' is 7-$CH_3$, A is $(CH_2)_3$, n is 1, R is (H)(OH)], 8-{3-[10-(4-chlorophenothiazinyl)]propyl}-3-hydroxynortropane [I; Y is 4-Cl, Y' is H, A is $(CH_2)_3$, n is 1, R is (H)(OH)], 8-{3 - [10 - (2,8 - dichlorophenothiazinyl)]propyl} - 3 - hydroxynortropane [I; Y is 2-Cl, Y' is 8-Cl, A is $(CH_2)_3$, n is 1, R is (H)(OH)], 8-{3-[10-(3-methoxyphenothiazinyl)]propyl}-3-hydroxynortropane [I; Y is 3-$OCH_3$, Y' is H, A is $(CH_2)_3$, n is 1, R is (H)(OH)], 8-{3-[10-(3,7-dimethoxyphenothiazinyl)]propyl} - 3 - hydroxynortropane [I; Y is 3-$OCH_3$, Y' is 7-$OCH_3$, A is $(CH_2)_3$, n is 1, R is (H)(OH)], 8-{3-[10-(3-chloro - 7 - methoxyphenothiazinyl)]propyl}-3-hydroxynortropane [I; Y is 3-Cl, Y' is 7-$OCH_3$, A is $(CH_2)_3$, n is 1, R is (H)(OH)], or 8-[1-methyl-2-(10-phenothiazinyl)ethyl]-3-hydroxynortropane [I; Y is H, Y' is H, A is $CH_2CH(CH_3)$, n is 1, R is (H)(OH)].

By substitution in the preceding example of the nortropine by a molar equivalent amount of 3-nortropinone (prepared by oxidation of nortropine by treatment with chromic oxide), 3-granatanone (prepared from pseudopelletierine by demethylation analogous to the preparation of nortropine in Example 5), or 3-granatanol (prepared by demethylation of 9-methyl-3-granatanol, or by reduction of 3-granatanone, e. g., with lithium aluminum hydride), there can be obtained, respectively, 8-{3-[10-(2-chlorophenothiazinyl)]propyl}-3-oxonortropane [I; Y is 2-Cl, Y' is H, A is $(CH_2)_3$, n is 1, R is O], 9-{3-[10-(2-chlorophenothiazinyl)]propyl}-3-oxogranatine [I; Y is 2-Cl, Y' is H, A is $(CH_2)_3$, n is 2, R is O], or 9-{3-[10-(2-chlorophenothiazinyl)]-propyl}-3-hydroxygranatanine [I; Y is 2-Cl, Y' is H, A is $(CH_2)_3$, n is 2, R is (H)(OH)].

8 - {3 - [10 - (2 - chlorophenothiazinyl)]propyl} - 3 - chloronortropane [I; Y is 2-Cl, Y' is H, A is $(CH_2)_3$, n is 1, R is (H)(Cl)] and 8-{3-[10-(2-chlorophenothiazinyl)]propyl}-3-bromonortropane [I; Y is 2-Cl, Y' is H, A is $(CH_2)_3$, n is 1, R is (H)(Br)] can be prepared by reacting 8 - {3 - [10 - (2 - chlorophenothiazinyl)]propyl}-3-hydroxynortropane with thionyl chloride or thionyl bromide, respectively. 8-{3-[10-(2-chlorophenothiazinyl)]propyl}-3-bromonortropane can be dehydrohalogenated by heating with a base, e. g., sodium hydroxide, pyridine, etc., and the resulting 8-{3-[10-(2-chlorophenothiazinyl)]propyl}nortropidine can be reduced catalytically to give 8-{3-[10-(2-chlorophenothiazinyl)]propyl}nortropane [I; Y is 2-Cl, Y' is H, A is $(CH_2)_3$, n is 1, R is $H_2$].

8 - {3 - [10 - (2 - chlorophenothiazinyl)]propyl} - 3 - hydroxynortropane can be caused to react with hydrochloric acid, hydrobromic acid, hydriodic acid, sulfuric acid, acetic acid, quinic acid, 2-napthalenesulfonic acid, phosphoric acid, methyl iodide, methyl bromide, ethyl bromide, allyl bromide, benzyl chloride, o-chlorobenzyl chloride, methyl p-toluenesulfonate or methyl sulfate, to give, respectively, the hydrochloride, hydrobromide, hydriodide, sulfate or bisulfate, acetate, quinate, 2-naphthalenesulfonate, phosphate or acid phosphate, methiodide, methobromide, ethobromide, allobromide, benzochloride, o - chlorobenzochloride, metho - p - toluenesulfonate, or methosulfate salt.

8 - {3 - [10 - (2 - chlorophenothiazinyl)]propyl} - 3 - hydroxynortropane can also be prepared by heating equimolar quantities of 2-chlorophenothiazine and 8-(3-chloropropyl)nortropine in the presence of sodium amide in refluxing xylene solution.

9 - {3 - [10 - (2 - chlorophenothiazinyl)]propyl} - 3 - hydroxygranatanine can be prepared by heating equimolar quantities of 2-chlorophenothiazine and 9-(3-chloropropyl)-3-granatanol in the presence of sodium amide in refluxing xylene.

EXAMPLE 16

*8 - {3 - [10 - (2 - chlorophenothiazinyl)]propyl} - 3 - cinnamoyloxynortropane*

[I; Y is 2 - Cl, Y' is H, A is $(CH_2)_3$, n is 1, R is (H)($OCOCH=CHC_6H_5$)] was prepared from 8.0 g. (0.020 mole) of 8-{3-[10-(2-chlorophenothiazinyl)]propyl}-3-hydroxynortropane and 3.8 g. (0.023 mole) of cinnamoyl chloride in 50 ml. of pyridine according to the manipulative procedure described above in Example 11. The product was recrystallized twice from hexane and then from acetone, and dried over phosphorus pentoxide in the usual manner, giving 8-{3-[10-(2-chlorophenothiazinyl)]propyl}-3-cinnamoyloxynortropane, M. P. 130.5–131.5° C. (corr.).

*Analysis.*—Calcd. for $C_{31}H_{31}ClN_2O_2S$: N, 5.28; C, 70.10; H, 5.88. Found: N, 5.21; C, 70.41; H, 5.73.

8 - {3 - [10 - (2 - chlorophenothiazinyl)]propyl} - 3 - cinnamoyloxynortropane reacts with hydrochloric acid, sulfuric acid, acetic acid and the like, to give hydrochloride, sulfate (or bisulfate), acetate, and the like salts.

EXAMPLE 17

*8 - {3 - [10 - (2 - chlorophenothiazinyl)]propyl} - 3 - benzoyloxynortropane*

I; Y is 2 - Cl, Y' is H, A is $(CH_2)_3$, n is 1, R is (H)($OCOC_6H_5$)] was prepared from 8.0 g. (0.020 mole) is 8 - {3 - [10 - (2 - chlorophenothiazinyl)]propyl} - 3 - hydroxynortropane and 3.4 g. (0.024 mole) of benzoyl chloride in 25 ml. of pyridine according to the manipulative procedure described above in Example 11, except that the reaction mixture was warmed at 65–75° C. prior to adding to ice water. The product was recrystallized several times from a hexane-acetone mixture and finally from acetone alone, and dried over phosphorus pentoxide as usual, giving 8-{3-[10-(2-chlorophenothiazinyl)]propyl}-3-benzoyloxynortropane, M. P. 94–98.5° C. (corr.).

Analysis.—Calcd. for $C_{29}H_{29}ClN_2O_2S$: N, 5.55; C, 68.96; H, 5.79. Found: N, 5.43; C, 68.89; H, 5.76.

EXAMPLE 18

8 - {3 - [10 - (2 - chlorophenothiazinyl)]propyl} - 3 - (3,4,5-trimethoxybenzoyloxy)nortropane I: Y is 2 - Cl, Y' is H, A is $(CH_2)_3$, $n$ is 1, R is $(H)(OCOC_6H_2(OCH_3)_3$-3,4,5)] was prepared from 8.0 g. (0.020 mole) of 8-{3-[10-(2-chlorophenothiazinyl)]propyl}-3-hydroxynortropane and 5.7 g. (0.025 mole) of 3,4,5-trimethoxybenzoyl chloride in 25 ml. of pyridine according to the manipulative procedure described above in Example 11, except that the reactants were mixed without cooling, and after ninety hours at room temperature the mixture was warmed on a steam bath for one hour. The product was recrystallized three times from acetone and dried over phosphorus pentoxide in the usual manner, giving 8- {3 - [10 - (2 - chlorophenothiazinyl)]propyl}-3-(3,4,5-trimethoxybenzoyloxy)nortropane, M. P. 155–158° C. (corr.).

Analysis.—Calcd. for $C_{32}H_{35}ClN_2O_5S$: N, 47.71; C, 64.57; H, 5.93. Found: N, 4.63; C, 64.54; H, 6.09.

EXAMPLE 19

(a) 3 - chloro - 10 - (3 - chloropropyl)phenothiazine was prepared from 5.3 g. (0.76 mole) of lithium wire, 52.0 g. (0.38 mole) of n-butyl bromide, 81.8 g. (0.35 mole) of 3-chlorophenothiazine, and 87 g. (0.35 mole) of 3-chloropropyl p-toluenesulfonate, according to the manipulative procedure described above in Example 14, part (b). The product was distilled, and the fraction boiling at 141–147° C. (0.04 mm.), 65.5 g., $n_D^{25}$=1.6660, was crystallized from hexane, giving 55 g. of 3-chloro-10-(3-chloropropyl)phenothiazine, M. P. 45–47° C. The analytic sample was dried over phosphorus pentoxide and had the M. P. 45–47.5° C. (corr.).

Analysis.—Calcd. for $C_{15}H_{13}Cl_2NS$: Cl, 22.86; S, 10.33. Found: Cl, 22.62; S, 10.25.

(b) 8-{3-[10-(3-chlorophenothiazinyl)]propyl}-3-hydroxynortropane

[I; Y is 3-Cl, Y' is H, A is $(CH_2)_3$, $n$ is 1, R is (H)(OH)] was prepared from 15.5 g. (0.050 mole) of 3-[10-(3-chlorophenothiazinyl)propylchloride, 7.0 g. (0.055 mole) of nortropine and 10.5 g. of sodium carbonate in 100 ml. of ethanol according to the manipulative procedure described above in Example 15. There was thus obtained 18.2 g. of 8-{3-[10-(3-chlorophenothiazinyl)]propyl}-3-hydroxynortropane, M. P. 144–146° C. A sample when recrystallized twice from acetone had the M. P. 146.5–148.5° C. (corr.).

Analysis.—Calcd. for $C_{22}H_{25}ClN_2OS$: N, 6.99; S, 7.99. Found: N, 6.86; S, 8.04.

8 - {3 - [10 - (3 - chlorophenothiazinyl)]propyl} - 3-hydroxynortropane reacts wiht hydrochloric acid, sulfuric acid, acetic acid and the like, to give the hydrochloride, sulfate (or bisulfate), acetate, and the like salts.

8 - {3 - [10 - (3 - chlorophenothiazinyl)]propyl} - 3-hydroxynortropane, dissolved in an equivalent amount of dilute hydrochloric acid, caused about 75% increase in the sleeping time of hexobarbital sodium treated mice when administered subcutaneously at a dose of 30 mg./kg.

EXAMPLE 20

8 - {3 - [10 - (3 - chlorophenothiazinyl)]propyl} - 3-acetoxynortropane

[I; Y is 3-Cl, Y' is H, A is $(CH_2)_3$, $n$ is 1, R is $(H)(OCOCH_3)$]. A mixture of 7.5 g. of 8-{3-[10-(3-chlorophenothiazinyl)]. propyl} - 3 - hydroxynortropane and 50 ml. of acetic anhydride was heated on a steam bath for four hours. After standing for about fifteen hours at room temperature the reaction mixture was concentrated in vacuo and the residue dissolved in chloroform. The chloroform solution was washed with 1 N sodium hydroxide solution, then with water, and dried over anhydrous calcium sulfate. The chloroform solution was concentrated and the residue recrystallized from acetone, giving 6.8 g. of 8-{3-[10-(3-chlorophenothiazinyl)]propyl}- 3 - acetoxynortropane, M. P. 106–108° C. A sample when recrystallized from acetone, using activated charcoal for decolorizing purposes, and dried over phosphorus pentoxide at 55° C. for four hours in vacuo (0.05 mm.), had the M. P. 107.5–109.5° C. (corr.).

Analysis.—Calcd. for $C_{24}H_{27}ClN_2O_2S$: N, 6.32; S, 7.24. Found: N, 6.27; S, 7.57.

EXAMPLE 21

8 - {3 - [10 - (3 - chlorophenothiazinyl)]propyl} - 3 - benzoyloxynortropane

[I; Y is 3-Cl, Y' is H, A is $(CH_2)_3$, $n$ is 1, R is $(H)(OCOC_6H_5)$] was prepared from 6.8 g. (0.017 mole) of 8-{3-[10-(3-chlorophenothiazinyl)]propyl}-3-hydroxynortropane and 3.5 g. (0.025 mole) of benzoyl chloride in 50 ml. of pyridine according to the manipulative procedure described above in Example 11. The product was recrystallized first from hexane and then twice from acetone, and dried over phosphorus pentoxide at 55° C. for five hours in vacuo (0.05 mm.), giving 4.1 g. of 8-{3-[10-(3-chlorophenothiazinyl)]propyl} - 3 - benzoyloxynortropane, M. P. 102–104.5° C. (corr.).

Analysis.—Calcd. for $C_{29}H_{29}ClN_2O_2S$: N, 5.55; C, 68.96; H, 5.79. Found: N, 5.38; C, 69.11; H, 5.85.

EXAMPLE 22

8 - {3 - [10 - (3 - chlorophenothiazinyl)]propyl} - 3 - cinnamoyloxynortropane

[I; Y is 3-cl, Y' is H, A is $(CH_2)_3$, $n$ is 1, R is $(H)(OCOCH=CHC_6H_5)$] was prepared from 6.8 g. (0.017 mole) of 8-{3-[10-(3-chlorophenothiazinyl)]propyl} - 3 - hydroxynortropane and 3.4 g. (0.0204 mole) of cinnamoyl chloride in 50 ml. of pyridine according to the manipulative procedure described above in Example 11. The product was recrystallized first from hexane and then from ethyl acetate, using activated charcoal and aluminum hydroxide for decolorizing purposes, and dried over phosphorus pentoxide at 55° C. for five hours in vacuo (0.05 mm.), giving 3.2 g. of 8-{3-[10-(3-chlorophenothiazinyl)]propyl} - 3 - cinnamoyloxynortropane, M. P. 114.5–115.5° C. (corr.).

Analysis.—Calcd. for $C_{31}H_{31}ClN_2O_2S$: N, 5.28; C, 70.10; H, 5.88. Found: N, 5.19; C, 69.90; H, 5.70.

EXAMPLE 23

8-{3 - [10 - (3 - chlorophenothiazinyl)propyl} - 3 - (3,4,5-trimethoxybenzoyloxy)nortropane

[I; Y is 3-Cl, Y' is H, A is $(CH_2)_3$, $n$ is 1, R is $(H)(OCOC_6H_2(OCH_3)_3$-3,4,5)] was prepared from 7.2 g. (0.018 mole) of 8-{3-[10-(3-chlorophenothiazinyl)]propyl}-3-hydroxynortropane and 4.6 g. (0.020 mole) of 3,4,5-trimethoxybenzoyl chloride in 25 ml. of pyridine according to the manipulative procedure described above in Example 11. The product was recrystallized from acetone, giving 5.6 g. of 8-{3-[10-(3-chlorophenothiazinyl)]propyl}-3 - (3,4,5 - trimethoxybenzoyloxy)nortropane, M. P. 164–165° C. A sample when recrystallized again from acetone, using activated charcoal for decolorizing purposes, and dried over phosphorus pentoxide in the usual manner, had the M. P. 165–166.5° C. (corr.).

Analysis.—Calcd. for $C_{32}H_{35}ClN_2O_5S$: N, 4.71; C, 64.58; H, 5.93. Found: N, 4.52; C, 64.85; H, 6.01.

EXAMPLE 24

8 - {3 - [10 - (2 - chlorophenothiazinyl)]propyl}pseudo-3-hydroxynortropane

[I; Y is 2-Cl, Y' is H, A is $(CH_2)_3$, $n$ is 1, R is (H)(OH)] was prepared from 15.5 g. (0.050 mole) of 3-[10 - (2 - chlorophenothiazinyl)]propyl chloride, 8.3 g. (0.055 mole) of pseudonortropine carbamate (M. P. 141–142° C., prepared from pseudonortropine, M. P. 132–134° C., and carbon dioxide) and 7.9 g. of sodium carbonate in 100 ml. of ethanol according to the manipulative procedure described above in Example 15. There was thus obtained 8-{3-[10-(2-chlorophenothiazinyl)]propyl}pseudo-3-hydroxynortropane, M. P. 96.5–101° C. (corr.).

*Analysis.*—Calcd. for $C_{22}H_{25}ClN_2OS$: N, 6.99; S, 7.99. Found: N, 6.77; S, 7.93.

Pharmacological evaluation of the compounds of the invention in mice and dogs has demonstrated that they possess a variety of depressant actions on the central and autonomic nervous system, the cardiovascular system and the skeletal-muscular system. They lower the blood pressure and antagonize the pressor effects of epinephrine in dogs, they decrease the incidence of vomiting induced by apomorphine in dogs, they lower the rectal temperature in mice, and they potentiate the sleeping time in mice induced by ether, thiopental sodium, or hexobarbital sodium. These results indicate their usefulness as hypotensive agents, antinauseants, antipyretics, and sedatives. The compounds can be prepared for used by dissolving under sterile conditions a salt form of the compounds in water (or an equivalent amount of a non-toxic acid if the free base is used), or in a physiologically compatible aqueous medium such as saline, and stored in ampules for intramuscular injection. Alternatively, they can be incorporated in tablet or capsule form for oral administration. They are formulated and used in the same way as known compounds having similar activities, such as chlorpromazine. The toxicity of the compounds of the invention is of the same order of magnitude as that of chlorpromazine.

I claim:

1. A compound selected from the group consisting of (A) N-[(10-phenothiazinyl)-lower-alkyl]-1,5-iminocycloalkanes wherein the 1,5-iminocycloalkane radical has at least seven ring members, (B) therapeutically acceptable acid-addition salts thereof, and (C) therapeutically acceptable quaternary ammonium salts thereof.

2. A therapeutically acceptable acid-addition salt of 8-[(10 - phenothiazinyl)-lower-alkyl]-3 - hydroxynortropane.

3. A therapeutically acceptable acid-addition salt of a compound having the formula

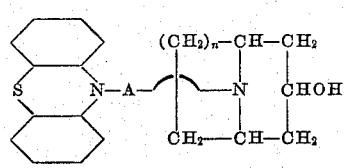

wherein A is a lower-alkylene bridge having from two to five carbon atoms and $n$ is an integer from 1 to 2.

4. A therapeutically acceptable acid-addition salt of a compound having the formula

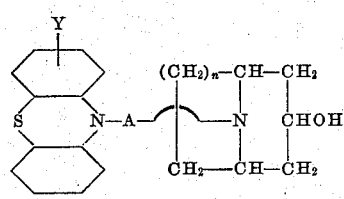

wherein A is a lower-alkylene bridge having from two to five carbon atoms, $n$ is an integer from 1 to 2, and Y is halogen.

5. A therapeutically acceptable acid-addition salt of a compound having the formula

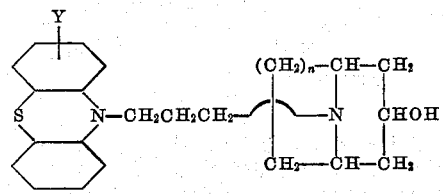

wherein $n$ is an integer from 1 to 2 and Y is halogen.

6. A therapeutically acceptable acid-addition salt of a compound having the formula

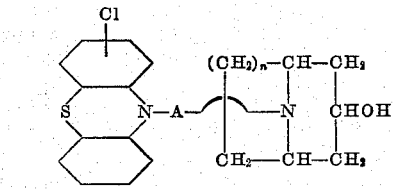

wherein A is a lower-alkylene bridge having from two to five carbon atoms, and $n$ is an integer from 1 to 2.

7. A therapeutically acceptable acid-addition salt of 8-{3-[10-(monochlorophenothiazinyl)]propyl}-3-hydroxynortropane.

8. A therapeutically acceptable acid-addition salt of 8-{3-[10-(2-chlorophenothiazinyl)]propyl}-3-hydroxynortropane.

9. A therapeutically acceptable acid-addition salt of 8-{3-[10-(3-chlorophenothiazinyl)]propyl}-3-hydroxynortropane.

10. A therapeutically acceptable acid-addition salt of 8-[3-(10-phenothiazinyl)propyl]-3-hydroxynortropane.

11. A therapeutically acceptable acid-addition salt of a compound having the formula

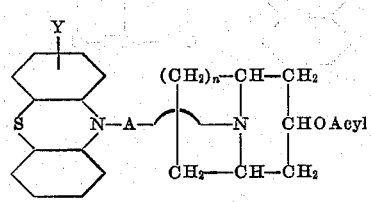

wherein A is a lower-alkylene bridge having from two to five carbon atoms, $n$ is an integer from 1 to 2, acyl is a carboxylic acyl group having a molecular weight less than about 250, and Y is halogen.

12. A therapeutically acceptable acid-addition salt of a compound having the formula

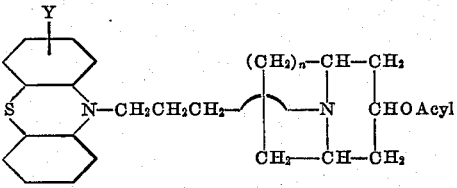

wherein $n$ is an integer from 1 to 2, Acyl is a carboxylic acyl group having a molecular weight less than about 250, and Y is halogen.

13. A therapeutically acceptable acid-addition salt of 8-{3-[10-(monochlorophenothiazinyl)]propyl}-3-acyloxynortropane wherein the acyl group is a carboxylic acyl group having a molecular weight less than about 250.

14. A therapeutically acceptable acid-addition salt of 8-{3-[10-(2-chlorophenothiazinyl)]propyl}-3-benzoyloxynortropane.

15. A therapeutically acceptable acid-addition salt of a compound having the formula

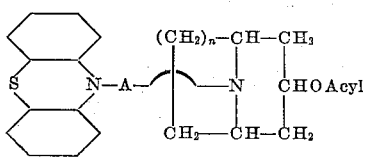

wherein A is a lower-alkylene bridge having from two to five carbon atoms, $n$ is an integer from 1 to 2, and Acyl is a carboxylic acyl group having a molecular weight less than about 250.

16. A therapeutically acceptable acid-addition salt of 8-[3-(10-phenothiazinyl)propyl]-3-acyloxynortropane wherein the acyl group is a carboxylic acyl group having a molecular weight less than about 250.

17. A therapeutically acceptable acid-addition salt of 8-[3-(10-phenothiazinyl)propyl]-3-(3,4,5-trimethoxybenzoyloxy)nortropane.

18. The process for preparing N-[(10-phenothiazinyl)-lower-alkyl]-1,5-iminocycloalkanes, wherein the 1,5-iminocycloalkane radical has at least seven ring members which comprises reacting 10-phenothiazinyl-lower-alkyl halides with 1,5-iminocycloalkanes in the presence of an acid acceptor in an inert solvent at a temperature between about 50° C. and 150° C.

19. The process for preparing 8-{3-[10-(2-chlorophenothiazinyl)]propyl}-3-hydroxynortropane, which comprises reacting 3-[10-(2-chlorophenothiazinyl)]propyl halides with nortropine in an inert solvent at a temperature between about 50° C. and 150° C. in the presence of an acid acceptor.

20. The process for preparing a compound having the formula

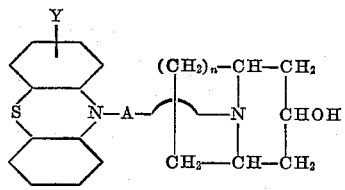

wherein A is a lower-alkylene bridge having from two to five carbon atoms, $n$ is an integer from 1 to 2, and Y is halogen, which comprises reacting a 10-(monohalophenothiazinyl)-lower-alkyl halide with a 3-hydroxy-1,5-iminocycloalkane in an inert solvent at a temperature between about 50° C. and 100° C. in the presence of an acid acceptor.

21. A therapeutically acceptable acid-addition salt of 8-[3-(10-phenothiazinyl)propyl]-3-acetoxynortropane.

22. A therapeutically acceptable acid-addition salt of 8-[3-(10-phenothiazinyl)propyl]-3-cinnamoyloxynortropane.

23. A therapeutically acceptable acid-addition salt of 8-[3-(10-phenothiazinyl)propyl]-3-benzoyloxynortropane.

24. A therapeutically acceptable acid-addition salt of 8-{3-[10-(2-chlorophenothiazinyl)]propyl}-3-cinnamoyloxynortropane.

25. A therapeutically acceptable acid-addition salt of 8-{3-[10-(3-chlorophenothiazinyl)]propyl}-3-acetoxynortropane.

26. A therapeutically acceptable acid-addition salt of 8-{3-[10-(2-chlorophenothiazinyl)]propyl}pseudo-3-hydroxynortropane.

References Cited in the file of this patent
UNITED STATES PATENTS

| | | |
|---|---|---|
| 2,483,998 | Hunter et al. | Oct. 4, 1949 |
| 2,645,640 | Charpentier | July 14, 1953 |
| 2,687,414 | Cusic | Aug. 24, 1954 |

UNITED STATES PATENT OFFICE
CERTIFICATE OF CORRECTION

June 10, 1958

Patent No. 2,838,505          Bernard L. Zenitz

It is hereby certified that error appears in the printed specification of the above numbered patent requiring correction and that the said Letters Patent should read as corrected below.

Column 6, line 18, for "N-O-diacetylnortropine" read -- N,O-diacetylnortropine --; column 11, line 73, for "3.5 x 60" read -- 3.5 x 60 cm. --; column 13, line 72, for "-3-oxogranatine" read -- -3-oxogranatanine --; column 14, line 67, for "is" read -- of --; column 15, line 24, for "N, 47.71" read -- N, 4.71 --.

Signed and sealed this 26th day of August 1958.

(SEAL)

Attest:

KARL H. AXLINE
Attesting Officer

ROBERT C. WATSON
Commissioner of Patents